R. N. JOHNSTON.
LIQUID FUEL BURNER.
APPLICATION FILED MAY 7, 1912.
1,062,714.
Patented May 27, 1913.
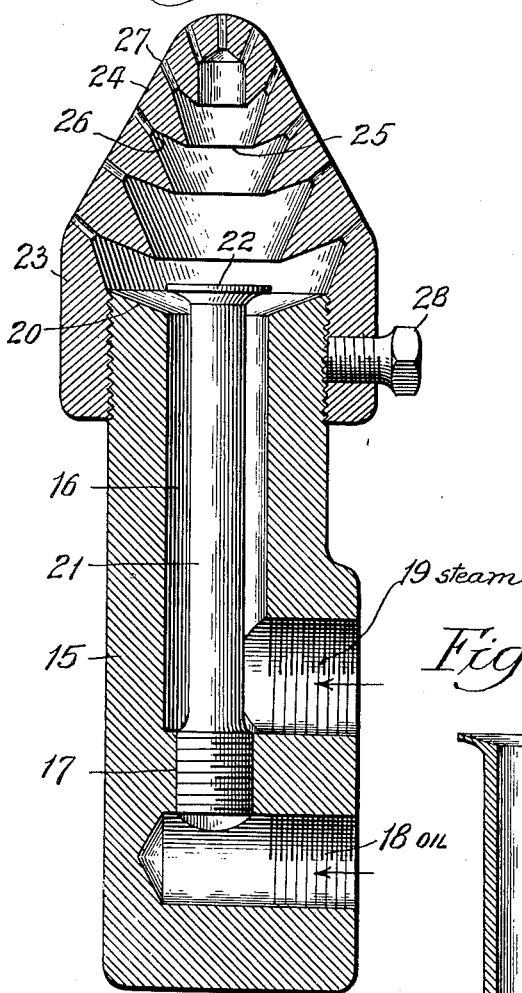
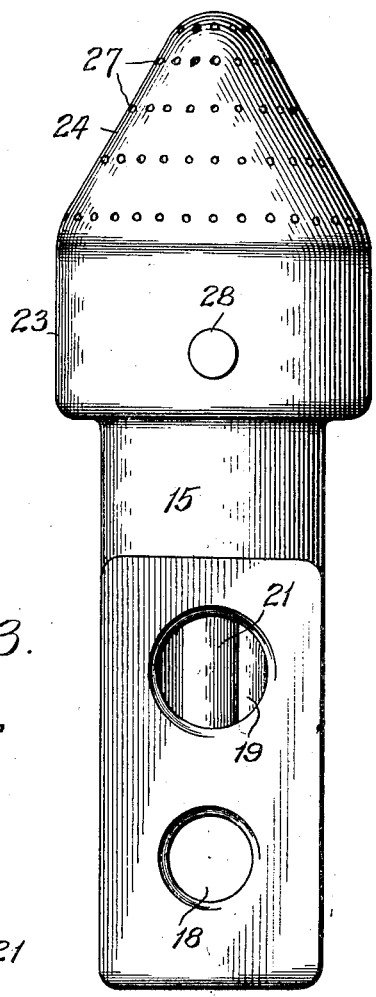
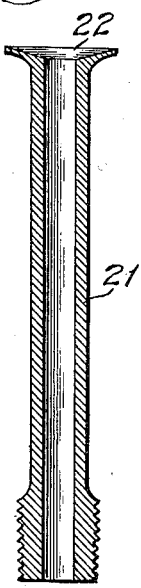
Witnesses:
John Enders
Henry A. Parks
Inventor:
Robert N. Johnston,
by Sheridan, Wilkinson, Scott & Richmond
Attys

UNITED STATES PATENT OFFICE.

ROBERT N. JOHNSTON, OF DENVER, COLORADO, ASSIGNOR OF ONE-HALF TO LOU D. SWEET, OF DENVER, COLORADO.

LIQUID-FUEL BURNER.

1,062,714.  Specification of Letters Patent.  Patented May 27, 1913.

Application filed May 7, 1912. Serial No. 695,638.

*To all whom it may concern:*

Be it known that I, ROBERT N. JOHNSTON, a citizen of the United States, residing at 1425 Logan street, Denver, in the county of Denver and State of Colorado, have invented certain new and useful Improvements in Liquid-Fuel Burners, of which the following is a specification.

The principal object of my invention is to provide a new and improved device for properly burning liquid fuel.

Another object of my invention is to provide a burner for spraying a comparatively thick liquid fuel so that it will ignite properly and burn efficiently.

Other objects of my invention relate to the construction of such a device and to making it simple and inexpensive and easy to keep in order.

All these objects and various others will be more readily appreciated and understood in connection with the following specification and claims, taken with the accompanying drawings.

In these drawings I have illustrated one specific embodiment of my invention and I now proceed to describe the same.

Figure 1 is a vertical central section of my improved burner. Fig. 2 is an elevation of the same looking in a direction at a right angle to that in which the view of Fig. 1 is taken. Fig. 3 is a section of an element of the apparatus.

The main member 15 has a cylindrical chamber 16 with a screw threaded inlet 19 at its lower end for a steam connection. Below this is a screw threaded inlet 18 for an oil connection and between the cylindrical chamber 16 and the oil inlet 18 is a screw threaded opening 17. The upper end of the main member 15 is slightly dished as indicated at 20.

The oil pipe 21 stands concentrically in the cylindrical chamber 16 with its lower end screw threaded and fitting in the correspondingly screw threaded opening 17 at the lower end of the cylindrical chamber 16. The upper end of the oil pipe 21 is flaring, as designated at 22. A cap 23 having a generally conical exterior is adapted to screw over the upper end of the member 15 and be fastened in place at any desired height of adjustment by means of the set screw 28. The interior of the conical part 24 of the cap 23 has a series of concentric depending flanges or lips 25 with grooves 26 between them. Through the conical part 24 of the cap 23 are circumferential series of perforations 27, these perforations connecting with the deepest points of the grooves or channels 26.

An oil supply pipe is connected at 18 and oil is forced with a suitable pressure therethrough and up through the pipe 21. This oil flows over the edges of the flaring top 22 where it is caught by the steam or other impelling fluid. A pipe to supply steam or other suitable impelling fluid is connected at 19 and the steam flows up in the annular passages surrounding the oil pipe 21. As this steam issues at the top 20 of the member 15 it catches the oil flowing over the edges of the top 22 of the pipe 21, and breaks it up more or less and drives it out through the perforations 27 where it is ignited and burns. The depending flanges 25 catch portions of the mixed oil and steam and thereby insure a proper distribution of the same.

By varying the height of the conical cap 23 the character of the flame can be varied somewhat, that is, when the cap is adjusted up high the flame spreads out more, but by lowering it the flame can be condensed to a more compact form.

This burner has been found very useful for burning a comparatively thick crude oil or residue. In this case the oil is subjected to the proper pressure to force it up through the inner pipe 21 and then the steam catches it and breaks it up and forces it out in proper shape for burning. By actual experience I have found that this burner is efficient and economical in its use of the oil. It will readily be seen that it is simple and rugged in construction, not expensive to build, and easy to keep in order, also that it is easily adjustable and requires no expert attendance.

I claim:

1. In a liquid fuel burner, a vertical pipe for the liquid fuel, an annular conduit for an impelling fluid surrounding said pipe, and a conical cap over the upper ends of said pipe and conduit, said cap having a series of depending concentric flanges within it and having perforations therethrough between said flanges.

2. In a liquid fuel burner, two conduits one for the liquid fuel and the other for an impelling fluid, said conduits having their discharge orifices adjacent to one another, and a cap over said discharge orifices of said conduits, said cap having a series of flanges on its inside directed toward said discharge orifices and having perforations therethrough between said flanges.

3. In a liquid fuel burner, two conduits one for the liquid fuel and the other for an impelling fluid, said conduits having their discharge orifices adjacent to one another, and a cap over said discharge orifices of said conduits, said cap having the general shape of a hollow cone with concentric circular flanges depending from its inside surface and having circular series of perforations therethrough between said flanges.

4. In a liquid fuel burner, two conduits one for the liquid fuel and the other for an impelling fluid, said conduits having their discharge orifices adjacent to one another, and a cap over said discharge orifices of said conduits, said cap having a series of flanges on its inside directed toward said discharge orifices and having perforations therethrough between said flanges and said cap also being adjustable toward or from said orifices.

5. In a liquid fuel burner, a member having two screw threaded lateral openings for the attachment respectively of impelling fluid and fuel supply pipes and having a cylindrical chamber open at one end and connected at the other to the impelling fluid supply opening, said member also having a screw threaded passage in alinement with the said cylindrical chamber between the impelling fluid opening and the fuel supply opening, a central oil pipe in said cylindrical chamber having its end screw threaded and fitting in the said screw threaded passage, said central oil pipe terminating adjacent to the end of the said member, and a conical perforated distributing cap over the end of the said member and the said oil pipe.

6. In a liquid fuel burner, a member having two holes drilled into the same on the side, a cylindrical chamber drilled in from one end to meet one of the holes and a screw threaded passage at the end of the cylindrical chamber connecting the two holes, an oil tube lying centrally in the cylindrical chamber and having one end in screw threaded engagement with said passage, and a conical perforated distributing cap on the end of the said member over the said cylindrical chamber and oil tube.

7. In a liquid fuel burner, a conduit for the liquid fuel, an annular conduit for an impelling fluid surrounding the liquid fuel conduit, and a conical cap over the ends of both conduits, said cap having a plurality of perforations therethrough, said cap being adjustable longitudinally with respect to said conduits whereby the shape of the flame may be varied as desired.

8. In a liquid fuel burner, a vertical pipe for the liquid fuel, an annular conduit for an impelling fluid surrounding said pipe, and a conical cap over the upper ends of said pipe and conduit, said cap having a series of depending concentric flanges within it and having perforations therethrough between said flanges, said cap being displaceable longitudinally with respect to said annular conduit and provided with a set screw to lock it at any desired point of adjustment.

In testimony whereof, I have subscribed my name.

ROBERT N. JOHNSTON.

Witnesses:
 Lou D. Sweet,
 Verne Coates.